(12) United States Patent
Oh et al.

(10) Patent No.: US 11,447,664 B2
(45) Date of Patent: Sep. 20, 2022

(54) COLOR WRAPPING FILM FOR VEHICLE

(71) Applicant: STEK CO., LTD., Seoul (KR)

(72) Inventors: Inhwan Oh, Seongnam-si (KR); Subin Park, Seoul (KR); Seunghwan Baek, Seoul (KR)

(73) Assignee: STEK CO., LTD., Seoul (KR)

( * ) Notice: Subject to any disclaimer, the term of this patent is extended or adjusted under 35 U.S.C. 154(b) by 0 days.

(21) Appl. No.: 17/347,060

(22) Filed: Jun. 14, 2021

(65) Prior Publication Data

US 2022/0195251 A1    Jun. 23, 2022

(30) Foreign Application Priority Data

Dec. 21, 2020 (KR) .................. 10-2020-0179890

(51) Int. Cl.
| | |
|---|---|
| *B32B 27/08* | (2006.01) |
| *C09J 7/29* | (2018.01) |
| *B32B 27/26* | (2006.01) |
| *B32B 27/40* | (2006.01) |
| *B32B 27/30* | (2006.01) |
| *B32B 7/12* | (2006.01) |
| *C09J 7/38* | (2018.01) |

(52) U.S. Cl.
CPC ............... *C09J 7/29* (2018.01); *B32B 7/12* (2013.01); *B32B 27/08* (2013.01); *B32B 27/26* (2013.01); *B32B 27/308* (2013.01); *B32B 27/40* (2013.01); *C09J 7/385* (2018.01); *B32B 2255/10* (2013.01); *B32B 2255/26* (2013.01); *B32B 2307/4026* (2013.01); *B32B 2307/584* (2013.01); *B32B 2605/00* (2013.01); *C09J 2203/354* (2020.08); *C09J 2301/122* (2020.08); *C09J 2301/162* (2020.08); *C09J 2433/00* (2013.01); *C09J 2475/006* (2013.01)

(58) Field of Classification Search
CPC .............. B32B 27/308; B32B 27/40; C08G 18/6216; C08G 18/622; C08G 18/6225; C08G 18/6229; C08G 18/6237; C08G 18/6241; C08G 18/6245; C08L 75/00; C08L 75/14; C08L 75/16
See application file for complete search history.

(56) References Cited

U.S. PATENT DOCUMENTS

| | | | |
|---|---|---|---|
| 2005/0175818 A1* | 8/2005 | Kawabata | B32B 27/308 |
| | | | 428/195.1 |
| 2014/0367040 A1* | 12/2014 | Traser | C08F 220/1808 |
| | | | 428/305.5 |

FOREIGN PATENT DOCUMENTS

| | | | |
|---|---|---|---|
| KR | 101803268 | * | 11/2017 |
| KR | 20190118267 | * | 10/2019 |

OTHER PUBLICATIONS

Machine translation of KR 2019-0118267 (Year: 2019).*
Machine Translation of KR 101803268 (Year: 2017).*

* cited by examiner

*Primary Examiner* — Zachary M Davis (57) ABSTRACT

The present disclosure relates to a color wrapping film for a vehicle, which has an excellent impact resistance and excellent scratch restorability due to a base layer and a coating layer formed of a polyurethane-based material, and suppresses discoloration caused by an external environment by adding a color pigment to a separate layer.

5 Claims, 9 Drawing Sheets

COLOR WRAPPING FILM FOR VEHICLE

BACKGROUND OF THE INVENTION

1. Field of the Invention

The present disclosure relates to a color wrapping film for a vehicle, which has an excellent impact resistance and excellent scratch restorability due to a base layer and a coating layer formed of a polyurethane-based material, and suppresses discoloration caused by an external environment by adding a color pigment to a separate layer.

2. Description of the Related Art

Since a polyvinyl chloride (PVC)-type wrapping film may implement various colors through surface printing, the PVC-type wrapping film has been used to change a color of a painted surface of a vehicle. However, the PVC-type wrapping film has relatively weak physical properties so as not to be suitable for protecting the painted surface of the vehicle. Accordingly, in recent years, a wrapping film including thermoplastic polyurethane (TPU) as a base layer is being used.

Korean Unexamined Patent Publication No. 10-2016-0149391 (Surface Protection Method Using Polyurethane Film; Patent Document 1) discloses a technology for coating a painted surface of a vehicle by implementing a color in a thermoplastic polyurethane layer itself. A wrapping film disclosed in Patent Document 1 may effectively protect the painted surface by elasticity of the thermoplastic polyurethane layer while implementing the color, whereas physical properties of the thermoplastic polyurethane layer may be lowered due to addition of a pigment so that yellowing may be caused by ultraviolet rays.

In addition, when the color is implemented in the thermoplastic polyurethane layer itself, it is difficult to uniformly print the color over a full width due to a thickness deviation, so that various colors may not be implemented.

Meanwhile, in order to implement a color of a thermoplastic polyurethane-based wrapping film, a pigment or the like may be added to an adhesive layer. In this case, however, physical properties of the adhesive layer to which the pigment is added may be lowered, so that a part of an adhesive may be melted to elute the color during film installation.

(Patent Document 0001) Patent Document 1: Korean Unexamined Patent Publication No. 10-2016-0149391

SUMMARY OF THE INVENTION

An object of the present disclosure is to provide a color wrapping film for a vehicle, which has an excellent impact resistance and excellent scratch restorability due to abase layer and a coating layer formed of a polyurethane-based material, and suppresses discoloration caused by an external environment by adding a color pigment to a separate layer.

To achieve the objects described above, according to one embodiment of the present disclosure, there is provided a color wrapping film for a vehicle, the color wrapping film including: a self-healing layer including polyurethane methacrylate and an isocyanate curing agent; a base layer disposed under the self-healing layer, and including thermoplastic polyurethane; a color layer disposed under the base layer, and including a urethane acrylate binder, a color pigment, a curing agent, and a solvent; and an adhesive layer disposed under the color layer, and including an acrylic copolymer, a curing agent, and a solvent, wherein the self-healing layer restores scratches generated on a surface of the color wrapping film for the vehicle, and the color layer serves as a primer between the base layer and the adhesive layer to prevent a transfer phenomenon of the adhesive layer.

In some embodiments of the present disclosure, the self-healing layer may include 75 to 90 parts by weight of the polyurethane methacrylate, and 15 to 40 parts by weight of the isocyanate curing agent.

In some embodiments of the present disclosure, the base layer may include non-yellowing thermoplastic polyurethane.

In some embodiments of the present disclosure, the color layer may include 50 to 60 parts by weight of the urethane acrylate binder, 5 to 10 parts by weight of the color pigment, 1 to 5 parts by weight of the curing agent, and 30 to 60 parts by weight of the solvent.

In some embodiments of the present disclosure, the adhesive layer may include 70 to 80 parts by weight of the acrylic copolymer, 0.5 to 5 parts by weight of the curing agent, and 30 to 60 parts by weight of the solvent.

In some embodiments of the present disclosure, a thickness of the self-healing layer may be 5 to 40 micrometers, a thickness of the base layer may be 100 to 250 micrometers, a thickness of the color layer may be 5 to 40 micrometers, and a thickness of the adhesive layer may be 5 to 40 micrometers.

According to one embodiment of the present disclosure, the self-healing layer is formed of a material having high elasticity, so that the scratches and contamination generated on the surface of the color wrapping film for the vehicle can be suppressed.

According to one embodiment of the present disclosure, the self-healing layer that restores the scratches is formed, so that a scratch resistance of the color wrapping film for the vehicle can be improved.

According to one embodiment of the present disclosure, the self-healing layer having excellent water repellency is formed, so that a contamination resistance of the color wrapping film for the vehicle can be improved.

According to one embodiment of the present disclosure, due to the base layer including the thermoplastic polyurethane, an impact resistance of the color wrapping film for the vehicle can be improved.

According to one embodiment of the present disclosure, the base layer is formed of the non-yellowing thermoplastic polyurethane, so that yellowing of the color wrapping film for the vehicle can be suppressed.

According to one embodiment of the present disclosure, the color layer including the color pigment is separately arranged, so that various colors can be stably implemented.

According to one embodiment of the present disclosure, the color layer is formed of a material that is based on a component similar to components of the base layer and the adhesive layer, so that the color layer can serve as the primer to prevent the transfer phenomenon of the adhesive layer.

DETAILED DESCRIPTION OF THE INVENTION

Various embodiments and/or aspects will be disclosed with reference to the drawings. In the following description, for the purpose of explanation, numerous specific details are set forth in order to provide a thorough understanding of one or more aspects. However, it shall also be appreciated by a person having ordinary skill in the art to which the present disclosure pertains that such aspect(s) may be practiced without the specific details. The following description and the accompanying drawings will be set forth in detail for specific illustrative aspects among the one or more aspects. However, the aspects are provided for illustrative purposes, some of various schemes based on principles of various aspects may be employed, and descriptions set forth herein are intended to include all the various aspects and equivalents thereof.

The terms "embodiment", "example", "aspect", "illustration", and the like used herein may not be construed as indicating that an aspect or design set forth herein is preferable or advantageous over other aspects or designs.

Further, the term "or" is intended to signify an inclusive "or" rather than an exclusive "or". In other words, unless otherwise specified or contextually unclear, the expression "X uses A or B" is intended to signify one of natural inclusive substitutions. That is, when X uses A; X uses B; or X uses both A and B, the expression "X uses A or B" may apply to either of the above cases. In addition, it is to be understood that the term "and/or" used herein refers to and includes all possible combinations of one or more of listed relevant items.

In addition, it is to be understood that the terms "include" and/or "comprise" indicate the presence of corresponding features and/or elements, but do not preclude the presence or addition of one or more other features, components, and/or groups thereof.

Further, in the present disclosure, it is to be understood that singular expressions such as "a(n)" and "the" include plural expressions as well, unless explicitly indicated otherwise. Accordingly, as an example, a "component surface" includes one or more component surfaces.

In addition, although the terms including an ordinal number such as "first" or "second" may be used to describe various elements, the elements are not limited by the terms. The above terms are used merely for the purpose of distinguishing one element from another element. For example, a first element may be termed as a second element, and similarly, a second element may also be termed as a first element without departing from the scope of the present disclosure. The term "and/or" includes any combination of a plurality of described relevant items, or one of the described relevant items.

Further, the terms used herein are used only to describe specific embodiments, and are not intended to limit the present disclosure. Unless the context explicitly indicates otherwise, an expression in a singular form includes a meaning of a plural form as well. In the present disclosure, the term such as "include" or "have" is intended to designate the presence of characteristics, numbers, steps, operations, elements, parts, or combinations thereof described herein, and shall not be construed to preclude any possibility of the presence or addition of one or more other characteristics, numbers, steps, operations, elements, parts, or combinations thereof.

In addition, in embodiments of the present disclosure, unless defined otherwise, all terms used herein, including technical and scientific terms, have the same meaning as those commonly understood by a person having ordinary skill in the art to which the present disclosure pertains. Any terms as those defined in generally used dictionaries are to be interpreted to have the meanings equal to the contextual meanings in the relevant field of art, and are not to be interpreted to have idealistic or excessively formalistic meanings unless explicitly defined in the embodiments of the present disclosure.

Structure of Color Wrapping Film 1 for Vehicle

Figure 1:
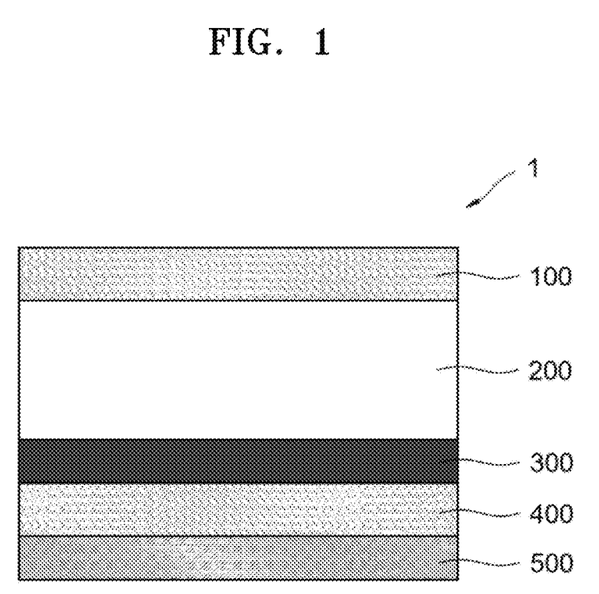
FIG. 1 is a view schematically showing a laminated structure of a color wrapping film for a vehicle according to one embodiment of the present disclosure.

FIG. 1 is a view schematically showing a laminated structure of a color wrapping film 1 for a vehicle according to one embodiment of the present disclosure.

According to one embodiment of the present disclosure, a color wrapping film 1 for a vehicle may include: a self-healing layer 100 including polyurethane methacrylate and an isocyanate curing agent; a base layer 200 disposed under the self-healing layer 100, and including thermoplastic polyurethane; a color layer 300 disposed under the base layer 200, and including a urethane acrylate binder, a color pigment, a curing agent, and a solvent; and an adhesive layer 400 disposed under the color layer 300, and including an acrylic copolymer, a curing agent, and a solvent, wherein the self-healing layer 100 may restore scratches generated on a surface of the color wrapping film 1 for the vehicle, and the color layer 300 may serve as a primer between the base layer 200 and the adhesive layer 400 to prevent a transfer phenomenon of the adhesive layer 400.

As shown in FIG. 1, according to one embodiment of the present disclosure, the color wrapping film 1 for the vehicle may include the self-healing layer 100, the base layer 200 disposed under the self-healing layer 100, the color layer 300 disposed under the base layer 200, and the adhesive layer 400 disposed under the color layer 300.

According to one embodiment of the present disclosure, the self-healing layer 100 may include the polyurethane methacrylate and the isocyanate curing agent.

Since scratches generated on a surface of a conventional self-healing layer are not properly restored, and the conventional self-healing layer has low water repellency, the conventional self-healing layer is vulnerable to external contamination.

In order to solve the above problem, the color wrapping film 1 for the vehicle according to the present disclosure was formed on the surface thereof with the self-healing layer 100 including the above components. In this case, the self-healing layer 100 may exhibit high elasticity, thereby restoring the scratches on the surface of the film. In addition, the self-healing layer 100 may exhibit high water repellency, thereby suppressing contamination of the surface of the film.

Preferably, the self-healing layer 100 may be formed of a material having high elasticity, so that the scratches and the contamination generated on the surface of the color wrapping film 1 for the vehicle may be suppressed.

Preferably, according to one embodiment of the present disclosure, the self-healing layer 100 may include 75 to 90 parts by weight of the polyurethane methacrylate, and 15 to 40 parts by weight of the isocyanate curing agent.

The above composition range of the self-healing layer 100 corresponds to a range in which self-healing characteristics may be implemented. In other words, since the self-healing layer 100 has the above composition, self-healing ability suitable for self-healing the scratches generated on the surface of the color wrapping film 1 for the vehicle may be implemented.

In addition, the above composition range of the self-healing layer 100 corresponds to a range in which excellent water repellency may be implemented. In other words, since the self-healing layer 100 has the above composition, water repellency suitable for preventing the contamination generated on the surface of the color wrapping film 1 for the vehicle may be implemented.

Preferably, the self-healing layer 100 that restores the scratches may be formed, so that a scratch resistance of the color wrapping film 1 for the vehicle may be improved.

In addition, the self-healing layer 100 having excellent water repellency may be formed, so that a contamination resistance of the color wrapping film 1 for the vehicle may be improved.

Meanwhile, according to one embodiment of the present disclosure, the base layer 200 may include the thermoplastic polyurethane.

Since a base layer of a conventional color wrapping film for a vehicle is formed of PVC and has relatively weak physical properties such as elasticity and tensile strength, the base layer of the conventional color wrapping film for the vehicle is not suitable for protecting a painted surface of the vehicle other than changing a color of the vehicle.

In order to solve the above problem, according to the present disclosure, the base layer 200 of the color wrapping film 1 for the vehicle was formed of the thermoplastic polyurethane. The thermoplastic polyurethane is a material having high elasticity. The base layer 200 including the thermoplastic polyurethane may exhibit high elasticity, thereby preventing the painted surface of the vehicle from being damaged by an external impact.

In other words, the base layer 200 may be formed of the thermoplastic polyurethane, so that the color wrapping film 1 for the vehicle having an excellent impact resistance may be implemented.

Preferably, due to the base layer 200 including the thermoplastic polyurethane, an impact resistance of the color wrapping film 1 for the vehicle may be improved.

According to one embodiment of the present disclosure, the base layer 200 may include the non-yellowing thermoplastic polyurethane.

Yellowing is caused in thermoplastic polyurethane by ultraviolet rays, which is mainly found in products in which pigments are added directly to the thermoplastic polyurethane. Since the color wrapping film 1 for the vehicle is an expensive product, when partial damage occurs, in general, only a damaged portion is replaced. In this case, however, a color difference may be caused by the yellowing.

As will be described below, according to the present disclosure, a separate color layer 300 is provided without directly adding a color to the base layer 200 of the color wrapping film 1 for the vehicle. Accordingly, even when the base layer 200 is formed of the thermoplastic polyurethane according to one embodiment of the present disclosure, yellowing of the color wrapping film 1 for the vehicle may rarely occur.

However, in order to provide color wrapping films 1 for vehicles having various specifications that may meet the needs of users, according to one embodiment of the present disclosure, the base layer 200 of the color wrapping film 1 for the vehicle was formed of the non-yellowing thermoplastic polyurethane.

The non-yellowing thermoplastic polyurethane is a UV-reinforced product, and corresponds to a material suitable for the base layer 200 of the color wrapping film because the non-yellowing thermoplastic polyurethane may minimize the yellowing caused by ultraviolet rays.

In other words, the base layer 200 may be formed of the non-yellowing thermoplastic polyurethane, so that yellowing of the color wrapping film 1 for the vehicle may be suppressed.

In addition, since the base layer 200 is formed of the non-yellowing thermoplastic polyurethane, the color layer 300 disposed under the base layer 200 may be prevented from being discolored or bleached.

Meanwhile, according to one embodiment of the present disclosure, the color layer 300 may include the urethane acrylate binder, the color pigment, the curing agent, and the solvent.

The conventional color wrapping film for the vehicle implements a color by performing printing on a PVC surface or adding a pigment to thermoplastic polyurethane or an adhesive layer.

However, a PVC film is not suitable for protecting the painted surface of the vehicle, and the yellowing is noticeable when the pigment is added directly to the thermoplastic polyurethane. In addition, since the thermoplastic polyurethane has a thickness deviation, it is difficult to perform the printing while maintaining a uniform color over a full width. In addition, when the pigment is added to the adhesive layer, the pigment is eluted by an installation liquid, which indicates that physical properties of the adhesive layer are lowered.

In order to solve the above problem, the color wrapping film 1 for the vehicle according to the present disclosure was configured such that a separate color layer 300 is disposed under the base layer 200. In this case, even when the base layer 200 is formed of the thermoplastic polyurethane, various colors may be stably implemented. Preferably, the color layer 300 including the color pigment is separately arranged, so that various colors may be stably implemented.

Preferably, according to one embodiment of the present disclosure, the color layer 300 may include 50 to 60 parts by weight of the urethane acrylate binder, 5 to 10 parts by weight of the color pigment, 1 to 5 parts by weight of the curing agent, and 30 to 60 parts by weight of the solvent.

The above composition range of the color layer 300 corresponds to a range in which various colors may be implemented. In other words, since the color layer 300 has the above composition, various colors of the color wrapping film 1 for the vehicle according to the present disclosure may be implemented. For example, a color wrapping film 1 for a vehicle, which has colors such as a black color, a red color, and a blue color, may be fabricated by combining a red pigment, a yellow pigment, and a blue pigment.

In addition, the above composition range of the color layer 300 corresponds to a range in which adhesion may be improved. In this case, the color layer 300 may correspond to a primer layer. In more detail, since the color layer 300 includes the urethane acrylate binder, adhesion between the urethane-based base layer 200 and the acrylic-based adhesive layer 400 may be enhanced.

In other words, since the color layer 300 has the above composition, the adhesion between the base layer 200 and the adhesive layer 400 may be improved. Accordingly, the color layer 300 may prevent a transfer phenomenon in which the adhesive layer 400 is transferred to the painted surface upon film removal.

Preferably, the color layer 300 may be formed of a material that is based on a component similar to components of the base layer 200 and the adhesive layer 400, so that the color layer 300 may serve as the primer to prevent the transfer phenomenon of the adhesive layer 400.

In addition, since the color wrapping film 1 for the vehicle according to one embodiment of the present disclosure includes the separate color layer 300, an influence on a color change of the color wrapping film 1 for the vehicle caused by the yellowing of the base layer 200 may be reduced.

Meanwhile, according to one embodiment of the present disclosure, the adhesive layer 400 may include the acrylic copolymer, the curing agent, and the solvent.

Preferably, according to one embodiment of the present disclosure, the adhesive layer 400 may include 70 to 80 parts by weight of the acrylic copolymer, 0.5 to 5 parts by weight of the curing agent, and 30 to 60 parts by weight of the solvent.

The above composition range of the adhesive layer 400 corresponds to a range in which strong adhesion is acquired. However, acrylic-based adhesives have low adhesion with thermoplastic polyurethane, so that when the adhesive has high adhesive strength, the adhesive may be transferred to the painted surface upon the film removal.

In order to solve the above problem, according to the present disclosure, the color layer 300 was disposed on the adhesive layer 400 as described above. In this case, the transfer phenomenon in which the adhesive layer 400 is transferred to the painted surface upon the film removal may be suppressed. Accordingly, the adhesive layer 400 may have strong adhesion without being transferred to the painted surface of the vehicle.

Meanwhile, as shown in FIG. 1, the color wrapping film 1 for the vehicle may further include a release film 500 disposed under the adhesive layer 400.

The release film 500 may protect the adhesive layer 400 until the color wrapping film 1 for the vehicle is attached to the painted surface of the vehicle.

In addition, since the release film 500 has to be easily removed by an installer during installation of the color wrapping film 1 for the vehicle, the release film 500 preferably has a weak peeling property. According to one embodiment of the present disclosure, the release film 500 may include all general release films 500 having a weak peeling property, in which the peeling property is difficult to become strong even when the time elapses in a state where the release film 500 is attached to the adhesive layer 400.

As shown in FIG. 1, the color wrapping film 1 for the vehicle may have a layered structure in which the self-healing layer 100, the base layer 200, the color layer 300, and the adhesive layer 400 are laminated.

According to one embodiment of the present disclosure, a thickness of the self-healing layer 100 may be 5 to 40 micrometers, a thickness of the base layer 200 may be 100 to 250 micrometers, a thickness of the color layer 300 may be 5 to 40 micrometers, and a thickness of the adhesive layer 400 may be 5 to 40 micrometers.

Since the layers constituting the color wrapping film 1 for the vehicle according to the present disclosure are formed within the above thickness ranges, respectively, the color wrapping film 1 for the vehicle, capable of implementing both a function of protecting the painted surface of the vehicle and a function of changing a color of the painted surface, having excellent durability, an excellent impact resistance, and excellent scratch restorability, capable of stably implementing various colors, and capable of suppressing discoloration caused by an external environment may be provided.

Hereinafter, Example and Comparative Examples according to the present disclosure will be described. In addition, results of characteristic tests performed on Example and Comparative Examples will be described in detail.

Experiments Related to Base Layer 200 Including Thermoplastic Polyurethane

In the present experiment, observation of performance of the color wrapping film 1 for the vehicle, which includes the thermoplastic polyurethane as the base layer 200 according to one embodiment of the present disclosure, was attempted. To this end, impact resistance, scratch restorability, and water repellency tests were performed on Example and Comparative Example according to the present disclosure.

The following wrapping films of Example and Comparative Example according to the present disclosure were used.

EXAMPLE 1

A color wrapping film 1 for a vehicle was prepared by forming a color layer 300, which includes 60 parts by weight of a urethane acrylate binder, 6 parts by weight of a color pigment, 2 parts by weight of a curing agent, and 50 parts by weight of a solvent, on a bottom surface of a base layer 200 including a thermoplastic polyurethane film having a thickness of 150 micrometers, forming an adhesive layer 400 including 70 parts by weight of an acrylic copolymer, 1 part by weight of a curing agent, and 55 parts by weight of a solvent on a bottom surface of the color layer 300, and forming a self-healing layer 100 including 80 parts by weight of polyurethane methacrylate and 32 parts by weight of an isocyanate curing agent on a top surface of the base layer 200. In other words, a laminated structure of Example 1 may be the same as the above-described structure of FIG. 1.

COMPARATIVE EXAMPLE 1

PVC color wrapping film (product name: Wrap Film Series 1080) sold by 3M Company. In other words, Comparative Example 1 corresponds to a color wrapping film including a PVC film as a base layer.

Figure 2A:
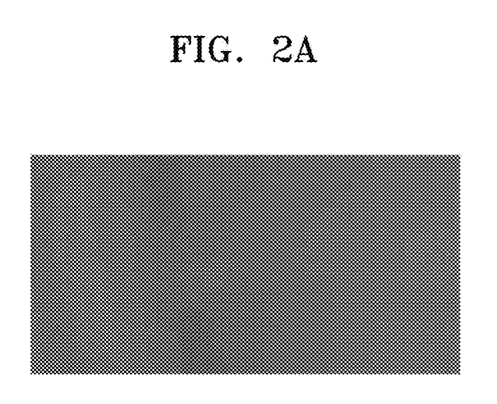
FIGS. 2A and 2B are views schematically showing impact resistance test results of Example and Comparative Example of color wrapping films for vehicles according to one embodiment of the present disclosure.
Figure 2B:
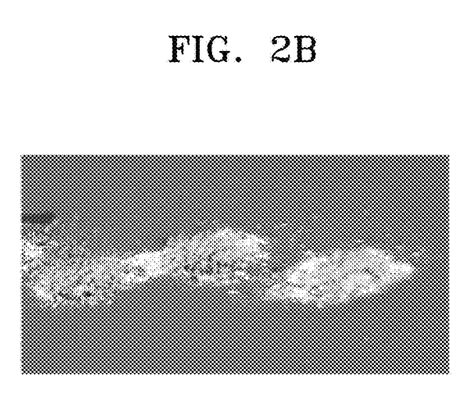

FIGS. 2A and 2B are views schematically showing impact resistance test results of Example and Comparative Example of color wrapping films 1 for vehicles according to one embodiment of the present disclosure.

In the present experiment, the impact resistance test was performed by using gravelometer test equipment. This test may observe how well a product is protected when an impact is applied to a surface of the film by using a weight attached to the equipment.

FIGS. 2A and 2B are views schematically showing the impact resistance test results of Example 1 and Comparative Example 1, respectively.

As shown in FIG. 2A, according to Example 1, it was found that the film is not damaged due to inherent elasticity and restoring force of the base layer 200.

Meanwhile, as shown in FIG. 2B, according to Comparative Example 1, it was found that the film is severely damaged by the base layer 200 having no elasticity and restoring force.

As described above, Example 1 according to the present disclosure may be determined as having very excellent impact absorption performance. In this case, the base layer 200 of Example 1 includes thermoplastic polyurethane, and the base layer 200 of Comparative Example 1 includes PVC.

In other words, the base layer 200 is formed of thermoplastic polyurethane, so that the impact resistance of the color wrapping film 1 for the vehicle according to one embodiment of the present disclosure may be improved.

Figure 3A:
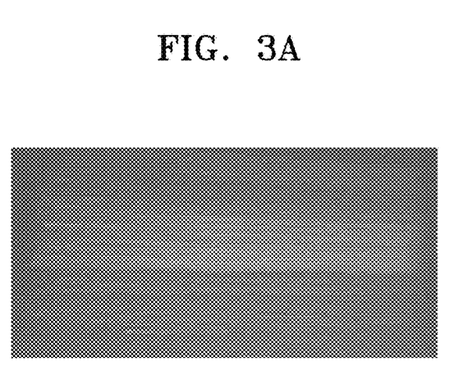
FIGS. 3A and 3B are views schematically showing scratch restorability test results of Example and Comparative Example of the color wrapping films for the vehicles according to one embodiment of the present disclosure.
Figure 3B:
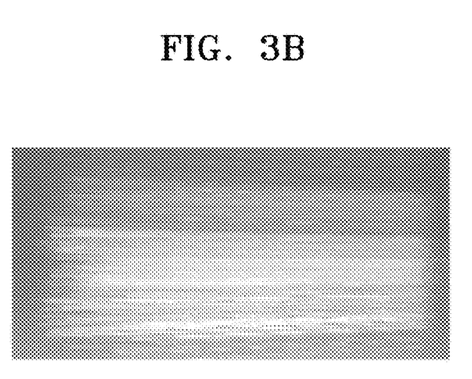

FIGS. 3A and 3B are views schematically showing scratch restorability test results of Example and Comparative Example of the color wrapping films 1 for the vehicles according to one embodiment of the present disclosure.

In the present experiment, scratches were generated on the surface of the film under conditions of 80 rpm and 500 reciprocations with steel wool (#0000) by using rubbing test equipment. After the scratches are generated, heat was applied to the surface of the film by using a dryer to observe whether the scratches are restored.

FIGS. 3A and 3B are views schematically showing the scratch restorability test results of Example 1 and Comparative Example 1, respectively.

As shown in FIG. 3A, according to Example 1, it was found that most of fine scratches are restored while deep scratches are not restored.

Meanwhile, as shown in FIG. 3B, according to Comparative Example 1, it was found that neither deep scratches nor fine scratches are restored so that the surface of the film is all peeled off.

As described above, Example 1 according to the present disclosure may effectively restore most of the scratches generated on the surface of the film by the self-healing layer 100 having scratch restorability.

In other words, the self-healing layer 100 according to one embodiment of the present disclosure may improve scratch restorability of the color wrapping film 1 for the vehicle.

According to the above results of FIGS. 2 and 3, the color wrapping film 1 for the vehicle according to one embodiment of the present disclosure may be determined as effectively protecting the painted surface of the vehicle from an external impact.

Meanwhile, Comparative Example 1 may be determined as not protecting the painted surface of the vehicle from an external impact.

Figure 4A:
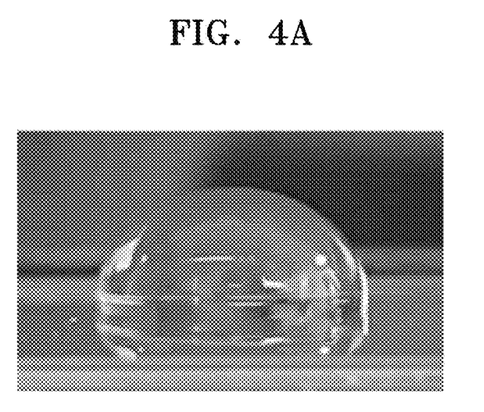
FIGS. 4A and 4B are views schematically showing water repellency test results of Example and Comparative Example of the color wrapping films for the vehicles according to one embodiment of the present disclosure.
Figure 4B:
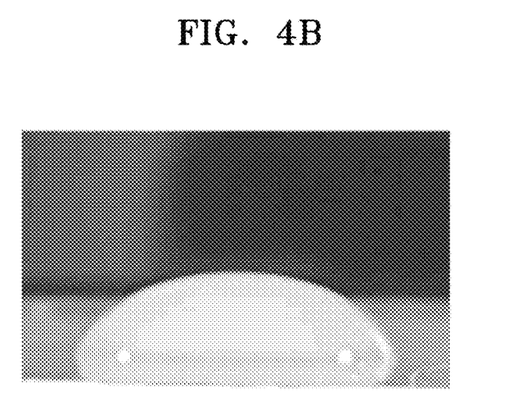

FIGS. 4A and 4B are views schematically showing water repellency test results of Example and Comparative Example of the color wrapping films 1 for the vehicles according to one embodiment of the present disclosure.

In the present experiment, a water droplet having the same mass was dropped on the surface of the film by using a micropipette, and a shape of the water droplet formed on the surface was observed.

FIGS. 4A and 4B are views schematically showing the water repellency test results of Example 1 and Comparative Example 1, respectively.

As shown in FIG. 4A, the water droplet dropped on the surface of Example 1 has a relatively round shape. In other words, it was found that Example 1 exhibits excellent water repellency.

Meanwhile, as shown in FIG. 4B, the water droplet dropped on the surface of Comparative Example 1 has a relatively elongated shape. In other words, it was found that Comparative Example 1 exhibits low water repellency.

As described above, Example 1 according to the present disclosure may have excellent water repellency due to a coating layer formed on a surface of the base layer 200, that is, the self-healing layer 100.

In other words, the self-healing layer 100 according to one embodiment of the present disclosure may improve water repellency of the color wrapping film 1 for the vehicle.

According to the above experimental results, the color wrapping film 1 for the vehicle according to one embodiment of the present disclosure may be determined as having an excellent impact resistance, excellent scratch restorability, and excellent water repellency.

Experiments Related to Separately Arranged Color Layer 300

In the present experiment, observation of performance of the color wrapping film 1 for the vehicle, which includes a separately arranged color layer 300 according to one embodiment of the present disclosure, was attempted. To this end, color insertion layer position, color stability, adhesion retention, scratch restorability, and water repellency tests were performed on Example and Comparative Examples according to the present disclosure.

Example 1 described above was used as Example according to the present disclosure, and the following wrapping films of Comparative Examples were used.

COMPARATIVE EXAMPLE 2

Color TPU PPF (product name: G-suit) sold by Ad-Winner Company. In other words, Comparative Example 2 corresponds to a color wrapping film in which a color is directly implemented in thermoplastic polyurethane.

COMPARATIVE EXAMPLE 3

Color PSA PPF. In other words, Comparative Example 3 corresponds to a color wrapping film in which a color is implemented by adding a pigment to an adhesive layer.

Figure 5A:
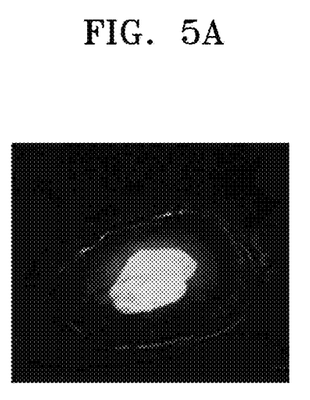
FIGS. 5A, 5B, and 5C are views schematically showing color insertion layer position test results of Example and Comparative Examples of color wrapping films for vehicles according to one embodiment of the present disclosure.
Figure 5B:
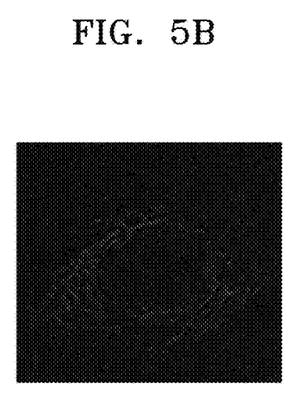
Figure 5C:
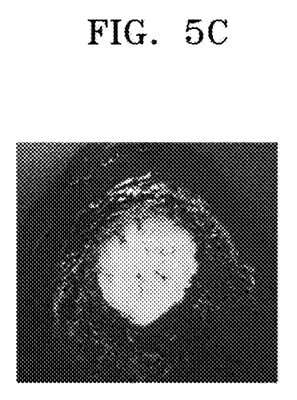

FIGS. 5A, 5B, and 5C are views schematically showing color insertion layer position test results of Example and Comparative Examples of color wrapping films 1 for vehicles according to one embodiment of the present disclosure.

In the present experiment, a position of a color insertion layer may be observed by removing an adhesive surface of the film by using a solvent. In the present experiment, MEK was used as the solvent.

FIGS. 5A, 5B, and 5C are views schematically showing the color insertion layer position test results of Example 1, Comparative Example 2, and Comparative Example 3, respectively.

As shown in FIG. 5A, according to Example 1, it was found that a color disappears after the adhesive layer 400 is removed in a first step. This means that the adhesive layer 400 and the color layer 300 are configured as separate structures.

Meanwhile, as shown in FIG. 5B, according to Comparative Example 2, it was found that a color is maintained even after the adhesive layer 400 is completely removed. This means that the thermoplastic polyurethane film itself has the color therein.

Meanwhile, as shown in FIG. 5C, according to Comparative Example 3, it was found that a color immediately disappears without any other layer in addition to the adhesive layer 400. This means that the color is implemented in an adhesive.

As described above, Embodiment 1 according to the present disclosure may be determined as implementing the color by arranging the separate color layer 300 on the adhesive layer 400.

Figure 6A:
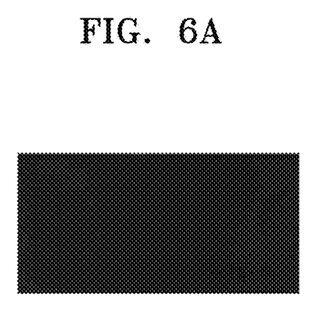
FIGS. 6A, 6B, and 6C are views schematically showing color stability test results of Example and Comparative Examples of the color wrapping films for the vehicles according to one embodiment of the present disclosure.
Figure 6B:
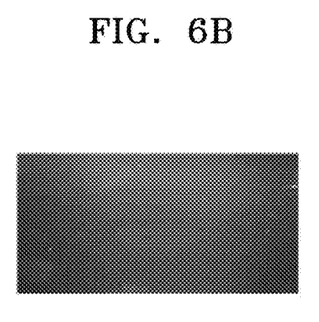
Figure 6C:
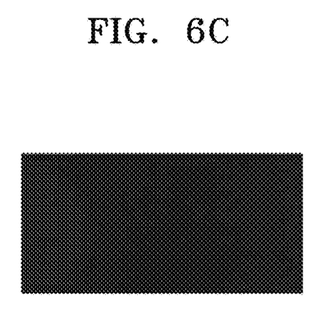

FIGS. 6A, 6B, and 6C are views schematically showing color stability test results of Example and Comparative Examples of the color wrapping films 1 for the vehicles according to one embodiment of the present disclosure.

In the present experiment, the surface of the film was irradiated with ultraviolet rays at a light intensity of 300 mJ by using a UV lamp for 1 hour. Thereafter, a level of discoloration of the surface of the film was observed with the naked eye.

FIGS. 6A, 6B, and 6C are views schematically showing the color stability test results of Example 1, Comparative Example 2, and Comparative Example 3, respectively.

As shown in FIGS. 6A and 6C, according to Example 1 and Comparative Example 3, it was found that a black color of the color wrapping film is not changed at all. In particular, in the case of Example 1, this means that an occurrence rate of discoloration or bleaching is relatively low in the color layer 300 or the adhesive layer 400 disposed under the base layer 200.

Meanwhile, as shown in FIG. 6B, according to Comparative Example 2, it was found that the color wrapping film is partially discolored or bleached. This means that the thermoplastic polyurethane film in which the color is implemented is discolored or bleached by ultraviolet rays.

As described above, Example 1 according to the present disclosure includes the separate color layer 300 including the color pigment, so that color stability of the color wrapping film 1 for the vehicle may be improved. In addition, since the color layer 300 is configured as a separate layer, an influence on a color change of the color wrapping film 1 for the vehicle caused by the yellowing of the base layer 200 may be reduced.

Figure 7A:
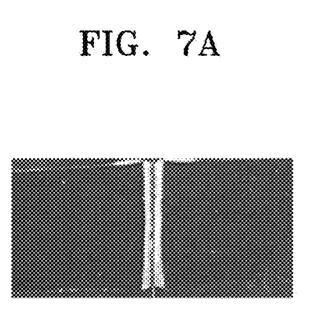
FIGS. 7A, 7B, and 7C are views schematically showing adhesion retention test results of Example and Comparative Examples of the color wrapping films for the vehicles according to one embodiment of the present disclosure.
Figure 7B:
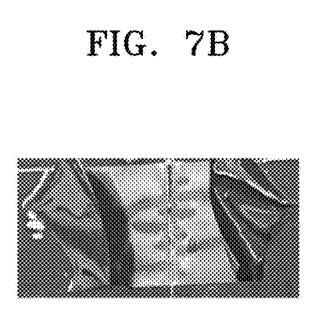
Figure 7C:
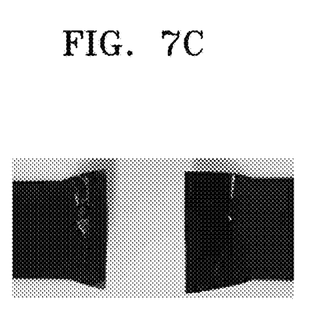

FIGS. 7A, 7B, and 7C are views schematically showing adhesion retention test results of Example and Comparative Examples of the color wrapping films 1 for the vehicles according to one embodiment of the present disclosure.

In the present experiment, each of the films was sampled in a size of 2.5 cm×19 cm, and attached to the same position. Thereafter, a center of each of the films was cut with a knife to observe retention of an adhesive for 24 hours.

FIGS. 7A, 7B, and 7C are views schematically showing the adhesion retention test results of Example 1, Comparative Example 2, and Comparative Example 3, respectively.

As shown in FIG. 7A, according to Example 1, it was found that there is hardly any gap between cut surfaces. This means that physical properties of the adhesive layer 400 are maintained while implementing the color by adding the color pigment to the color layer 300. In addition, this means that the color layer 300 serves as a primer for improving adhesion between the base layer 200 and the adhesive layer 400.

Meanwhile, as shown in FIG. 7B, according to Comparative Example 2, it was found that peeling occurs between the adhesive layer 400 and the base layer 200. This means that adhesion between the base layer 200 and the adhesive layer 400 is reduced because the color is directly added to the thermoplastic polyurethane base layer 200. Accordingly, when the film is installed on a vehicle with many curved portions, a lifting phenomenon may occur.

In addition, as shown in FIG. 7C, according to Comparative Example 3, it was found that there is a relatively large gap between cut surfaces. This means that the physical properties of the adhesive layer 400 are reduced because the color is added to the adhesive layer 400. Accordingly, when the film is installed on the vehicle with many curved portions, a lifting phenomenon may occur.

As described above, Example 1 according to the present disclosure implements the color by adding the color pigment to the color layer 300, so that adhesion retention of the color wrapping film 1 for the vehicle may be improved.

Figure 8A:
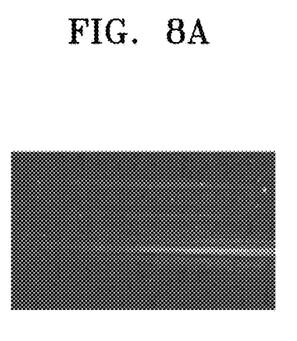
FIGS. 8A, 8B, and 8C are views schematically showing scratch restorability test results of Example and Comparative Examples of the color wrapping films for the vehicles according to one embodiment of the present disclosure.
Figure 8B:
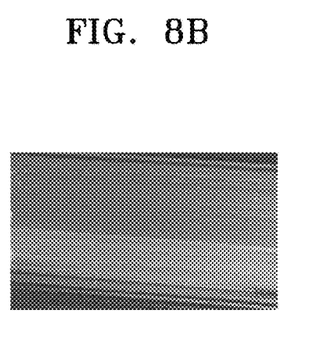
Figure 8C:
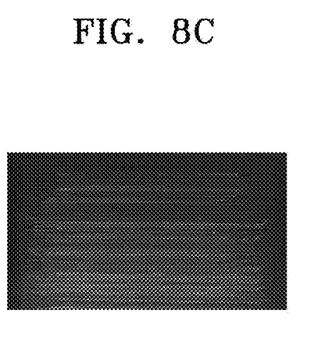

FIGS. 8A, 8B, and 8C are views schematically showing scratch restorability test results of Example and Comparative Examples of the color wrapping films 1 for the vehicles according to one embodiment of the present disclosure.

In the present experiment, as described above, scratches were generated on the surface of the film under conditions of 80 rpm and 500 reciprocations with steel wool (#0000) by using rubbing test equipment. After the scratches are generated, heat was applied to the surface of the film by using a dryer to observe whether the scratches are restored.

FIGS. 8A, 8B, and 8C are views schematically showing the scratch restorability test results of Example 1, Comparative Example 2, and Comparative Example 3, respectively.

As shown in FIG. 8A, according to Example 1, it was found that most of fine scratches are restored while deep scratches are not restored.

Meanwhile, as shown in FIGS. 8B and 8C, according to Comparative Example 2 and Comparative Example 3, it was found that neither deep scratches nor fine scratches are restored so that most parts of the film are peeled off.

As described above, Example 1 according to the present disclosure may effectively restore most of the scratches generated on the surface of the film by the self-healing layer 100 having scratch restorability.

In other words, the self-healing layer 100 according to one embodiment of the present disclosure may improve scratch restorability of the color wrapping film 1 for the vehicle.

Figure 9A:
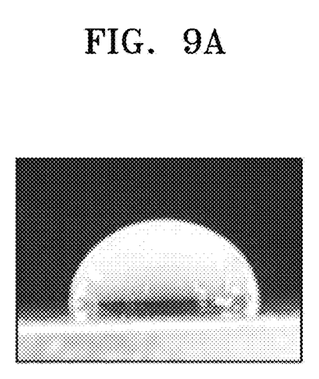
FIGS. 9A, 9B, and 9C are views schematically showing water repellency test results of Example and Comparative Examples of the color wrapping films for the vehicles according to one embodiment of the present disclosure.
Figure 9B:
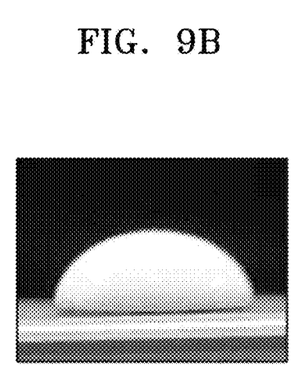
Figure 9C:
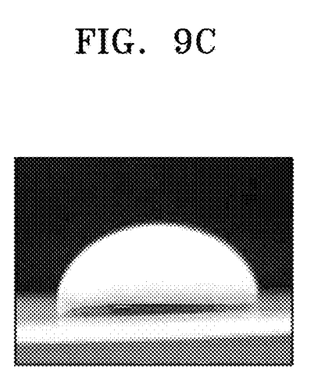

FIGS. 9A, 9B, and 9C are views schematically showing water repellency test results of Example and Comparative Examples of the color wrapping films 1 for the vehicles according to one embodiment of the present disclosure.

In the present experiment, as described above, a water droplet having the same mass was dropped on the surface of the film by using a micropipette, and a shape of the water droplet formed on the surface was observed.

FIGS. 9A, 9B, and 9C are views schematically showing the water repellency test results of Example 1, Comparative Example 2, and Comparative Example 3, respectively.

As shown in FIG. 9A, the water droplet dropped on the surface of Example 1 has a relatively round shape. In other words, it was found that Example 1 exhibits excellent water repellency. Meanwhile, as shown in FIGS. 9B and 9C, the water droplets dropped on the surfaces of Comparative Examples 2 and 3 have a relatively elongated shape. In other words, it was found that Comparative Example 2 and Comparative Example 3 exhibit low water repellency.

As described above, Example 1 according to the present disclosure may have excellent water repellency due to a coating layer formed on a surface of the base layer 200, that is, the self-healing layer 100.

In other words, the self-healing layer 100 according to one embodiment of the present disclosure may improve water repellency of the color wrapping film 1 for the vehicle.

According to the above experimental results, the color wrapping film for the vehicle according to one embodiment of the present disclosure implements the color by adding the color pigment to the separate color layer, so that the color wrapping film for the vehicle according to one embodiment of the present disclosure may be determined as having excellent color stability and excellent adhesive retention.

In addition, the color wrapping film for the vehicle according to one embodiment of the present disclosure includes the thermoplastic polyurethane as the base layer, so that the color wrapping film for the vehicle according to one embodiment of the present disclosure may be determined as having excellent scratch restorability and excellent water repellency.

According to one embodiment of the present disclosure, the self-healing layer is formed of a material having high elasticity, so that the scratches and contamination generated on the surface of the color wrapping film for the vehicle can be suppressed.

According to one embodiment of the present disclosure, the self-healing layer that restores the scratches is formed, so that a scratch resistance of the color wrapping film for the vehicle can be improved.

According to one embodiment of the present disclosure, the self-healing layer having excellent water repellency is formed, so that a contamination resistance of the color wrapping film for the vehicle can be improved.

According to one embodiment of the present disclosure, due to the base layer including the thermoplastic polyurethane, an impact resistance of the color wrapping film for the vehicle can be improved.

According to one embodiment of the present disclosure, the base layer is formed of the non-yellowing thermoplastic polyurethane, so that yellowing of the color wrapping film for the vehicle can be suppressed.

According to one embodiment of the present disclosure, the color layer including the color pigment is separately arranged, so that various colors can be stably implemented.

According to one embodiment of the present disclosure, the color layer is formed of a material that is based on a component similar to components of the base layer and the adhesive layer, so that the color layer can serve as the primer to prevent the transfer phenomenon of the adhesive layer.

The descriptions of the embodiments set forth herein are provided to enable any person having ordinary skill in the art to use or implement the present disclosure. It will be apparent to the person having ordinary skill in the art that various modifications can be made to the embodiments, and general principles defined herein may be applied to other embodiments without departing from the scope of the present disclosure. Accordingly, the present disclosure is not limited to the embodiments set forth herein, but is to be construed in the broadest scope consistent with the principles and novel features set forth herein.

What is claimed is:

1. A color wrapping film for a vehicle, the color wrapping film comprising:
   a self-healing layer including polyurethane methacrylate and an isocyanate curing agent;
   a base layer disposed under the self-healing layer, and including thermoplastic polyurethane;
   a color layer disposed under the base layer, and formed from a composition containing a urethane acrylate binder, a color pigment, a curing agent, and a solvent; and
   an adhesive layer disposed under the color layer, and formed from a composition containing an acrylic copolymer, a curing agent, and a solvent,
   wherein the self-healing layer restores scratches generated on a surface of the color wrapping film for the vehicle, and
   the color layer serves as a primer between the base layer and the adhesive layer to prevent a transfer phenomenon of the adhesive layer, wherein the color layer is formed from the composition containing 50 to 60 parts by weight of the urethane acrylate binder, 5 to 10 parts by weight of the color pigment, 1 to 5 parts by weight of the curing agent, and 30 to 60 parts by weight of the solvent.

2. The color wrapping film of claim 1, wherein the self-healing layer includes 75 to 90 parts by weight of the polyurethane methacrylate, and 15 to 40 parts by weight of the isocyanate curing agent.

3. The color wrapping film of claim 1, wherein the base layer includes non-yellowing thermoplastic polyurethane.

4. The color wrapping film of claim 1, wherein the adhesive layer is formed from a composition containing 70 to 80 parts by weight of the acrylic copolymer, 0.5 to 5 parts by weight of the curing agent, and 30 to 60 parts by weight of the solvent.

5. The color wrapping film of claim 1, wherein a thickness of the self-healing layer is 5 to 40 micrometers,
   a thickness of the base layer is 100 to 250 micrometers,
   a thickness of the color layer is 5 to 40 micrometers, and
   a thickness of the adhesive layer is 5 to 40 micrometers.

\* \* \* \* \*